(12) United States Patent
Woo

(10) Patent No.: US 7,362,217 B2
(45) Date of Patent: Apr. 22, 2008

(54) INTERIOR ILLUMINATION SYSTEM AND METHOD FOR A MOTOR VEHICLE

(75) Inventor: Victor Woo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 330 days.

(21) Appl. No.: 11/109,879

(22) Filed: Apr. 20, 2005

(65) Prior Publication Data
US 2006/0239017 A1 Oct. 26, 2006

(51) Int. Cl.
- B60Q 1/00 (2006.01)
- B60Q 1/26 (2006.01)
- B60Q 11/00 (2006.01)
- F21V 21/28 (2006.01)
- F21V 1/00 (2006.01)

(52) U.S. Cl. .................. 340/442; 340/458; 315/79; 362/465

(58) Field of Classification Search ............ 362/28–30, 362/465; 340/438–462, 936, 988–996; 315/76–79
See application file for complete search history.

(56) References Cited

U.S. PATENT DOCUMENTS

| | | | |
|---|---|---|---|
| 3,879,617 A | 4/1975 | Faller | |
| 4,564,789 A * | 1/1986 | Kokubu | 315/79 |
| 5,583,484 A | 12/1996 | Asano | |
| 5,815,072 A * | 9/1998 | Yamanaka et al. | 340/461 |
| 5,877,897 A | 3/1999 | Schofield et al. | |
| 6,133,827 A * | 10/2000 | Alvey et al. | 340/438 |
| 6,302,545 B1 | 10/2001 | Schofield et al. | |
| 6,326,900 B2 | 12/2001 | DeLine et al. | |
| 6,343,869 B1 * | 2/2002 | Kobayashi | 362/37 |
| 6,351,072 B1 * | 2/2002 | Mutoh et al. | 315/77 |
| 6,523,964 B2 | 2/2003 | Schofield et al. | |
| 6,583,569 B1 * | 6/2003 | Wang | 315/79 |
| 6,762,741 B2 | 7/2004 | Weindorf | |
| 6,802,617 B2 | 10/2004 | Schofield et al. | |
| 6,943,342 B2 | 9/2005 | Bechtel et al. | |
| 6,953,253 B2 | 10/2005 | Schofield et al. | |
| 2003/0214242 A1 | 11/2003 | Berg-Johansen | |
| 2005/0200468 A1 * | 9/2005 | Ozaki et al. | 340/466 |

FOREIGN PATENT DOCUMENTS

JP    4143134    5/1992

* cited by examiner

Primary Examiner—Benjamin O. Lee
Assistant Examiner—Jennifer Mehmood
(74) Attorney, Agent, or Firm—Plumsea Law Group, LLC; Mark E. Duell

(57) ABSTRACT

A system and method for providing interior illumination in a motor vehicle is disclosed. The system and method include provisions for adjusting the interior lighting conditions to improve visibility of the illuminated objects under different ambient lighting conditions. In some cases, the system and method can also include provisions that adjust interior lighting conditions quickly if sudden changes in ambient light are detected, to prevent flicker and/or to provide a continuously variable or continuously relative dimming.

16 Claims, 15 Drawing Sheets

INTERIOR ILLUMINATION SYSTEM AND METHOD FOR A MOTOR VEHICLE

BACKGROUND OF THE INVENTION

1. Field of the Invention

This invention relates to the field of motor vehicles, and more particularly, to a system and method for providing interior illumination in a motor vehicle.

2. Related Art

Motor vehicles generally provide some kind of interior illumination or lighting. Interior lighting can be provided to a number of different locations and can be used to illuminate different components and systems associated with the interior of a motor vehicle. Some examples of interior illumination include a dome light and a map light. Dome lights generally provide illumination to most of the passenger cabin. This can assist drivers and occupants in entering or exiting a motor vehicle at night time. Map lights can provide directed illumination to assist in reading maps or directions. Unlike dome lights, map lights can be designed to operate while the motor vehicle is in motion.

Other components are also illuminated to assist with visibility during low light conditions. Low light conditions include night time, dawn, dusk and low light conditions caused by objects that obstruct sunlight. Examples of obstructions include trees, woods, bridges, buildings and tunnels. In some cases, certain components are illuminated to assist with their visibility during low light conditions. Some examples of components that are illuminated include switches, the dashboard, the instrument cluster and the center console. These components can be back lit, directly lit or these components can include elements that illuminate like LCD's or LED's.

Various lighting control systems have been proposed. U.S. Pat. No. 5,583,484 to Asano discloses a lighting control apparatus on a control panel in an automobile including brightness control means responsive to an operation of a dimmer knob for giving brightness setting information, for giving a brightness signal for controlling a luminosity of an instrument panel, and for giving a luminosity of the control panel, which is provided near the instrument panel to a luminosity corresponding to the operation of the dimmer knob.

U.S. Patent Application No. 2003/0214242 to Berg-Johansen discloses a system for controlling light including a display readable in fall daylight conditions as well as at the other extreme, in complete darkness. Sudden changes in the interior cockpit lighting conditions may occur, such as when the general cockpit lighting is turned on or off or when clouds block direct sunlight. An appropriate amount of backlight illumination is required to ensure consistent, readable avionics displays under a variety of changing lighting conditions.

Japanese Patent Number 4143134 to Takesato and assigned to Mazda, discloses lighting for appliances such as liquid crystals and fluorescent lamps provided for the instrument panel and its peripheries of a vehicle. The lighting appliances are dimmed by dimming commands from a dimming circuit which is operated with both a switch in a small lamp system and a head lamp switch turned on. A dimming adjust circuit is interposed within a control unit and sends a mode signal to the dimming circuit in response to an input from a sunshine sensor so the degree of dimming can be adjusted in response to external brightness.

While the proposed lighting systems discussed above include some features; none of the proposed lighting control systems provides a system that can rapidly respond to sudden changes in ambient lighting conditions, prevents flicker, or offers a continuously variable dimming system. There is currently a need for a system that improves the visibility of interior elements by addressing the noted shortcomings.

SUMMARY OF THE INVENTION

An interior illumination system and method are disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a method for controlling at least one interior illumination device of a motor vehicle comprising the steps of: retrieving vehicle speed information related to a speed of the motor vehicle; providing a signal to the interior illumination device based on the vehicle speed information; and wherein the vehicle speed information is used to alter the condition of the interior illumination device.

In another aspect, the condition is related to an illumination level of the interior illumination device.

In another aspect, the method provides a step of providing a delay timer if the vehicle speed information indicates a vehicle speed that is less than a predetermined speed.

In another aspect, the delay timer holds a current condition of the interior illumination device.

In another aspect, the condition of the interior illumination device is adjusted after the timer has elapsed.

In another aspect, the delay timer has a time duration greater than an inherent delay of an interior illuminating system.

In another aspect, the method provides a step of resetting a delay timer if the vehicle speed information indicates a vehicle speed that is greater than or equal to a predetermined speed.

In another aspect, the invention provides an interior illumination system comprising: at least one interior illumination device; an input device configured to receive information from a user; an ambient light detector configured to provide a signal related to an ambient lighting condition; wherein the interior illumination system provides a signal to the interior illumination device based on input information received from the input device and ambient light information received from the ambient light detector; wherein the signal to the interior illumination device is continuously variable.

In another aspect, the interior illumination device is an instrument cluster.

In another aspect, the interior illumination device is a switch.

In another aspect, the interior illumination device is a display.

In another aspect, the interior illumination system continuously changes a brightness level for the interior illumination device as ambient light information received from the ambient light detector continuously changes.

In another aspect, the interior illumination system continuously changes a maximum available brightness level for the interior illumination device as ambient light information received from the ambient light detector continuously changes.

In another aspect, the interior illumination system continuously changes a minimum available brightness level for the interior illumination device as ambient light information received from the ambient light detector continuously changes.

In another aspect, the invention provides a method for controlling an interior illumination system of a motor vehicle comprising the steps of: retrieving information related to an ambient light level; determining a rate of change of the ambient light level; and altering an illumination characteristic of at least one illuminated component based on the rate of change of the ambient light level.

In another aspect, the illumination characteristic is changed if the rate of change is greater than a predetermined rate of change.

In another aspect, the illumination characteristic is changed if the rate of change is less than a predetermined rate of change.

In another aspect, the method provides a step of determining an initial ambient light level and comparing the initial ambient light level to at least one predetermined light limit.

In another aspect, the illumination characteristic is changed if the rate of change is less than a predetermined rate of change and if the initial ambient light level is greater than the predetermined light limit.

In another aspect, the illumination characteristic is changed if the rate of change is greater than a predetermined rate of change and if the initial ambient light level is less than the predetermined light limit.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENT(S)

Figure 1:
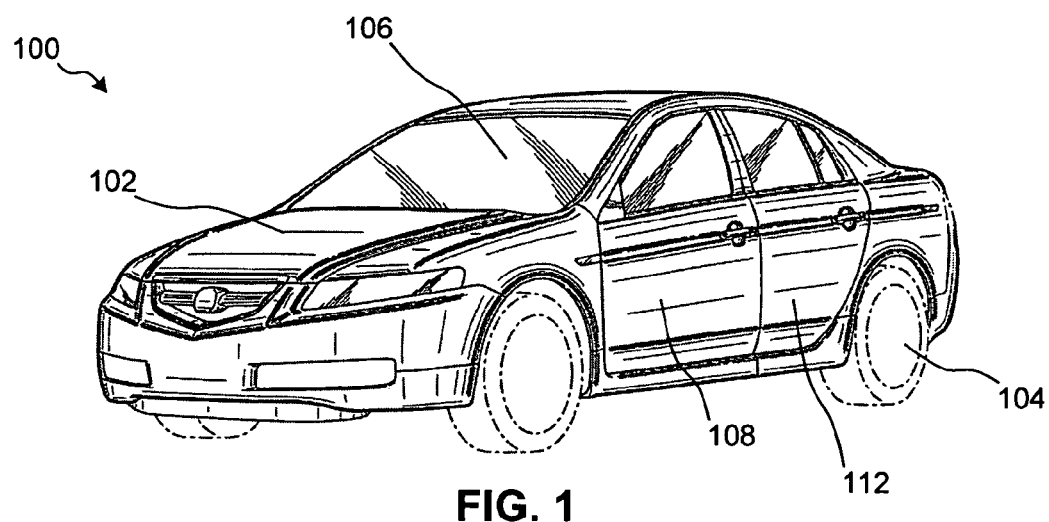
FIG. 1 is a schematic diagram of a preferred embodiment of a vehicle in accordance with the present invention.
Figure 2:
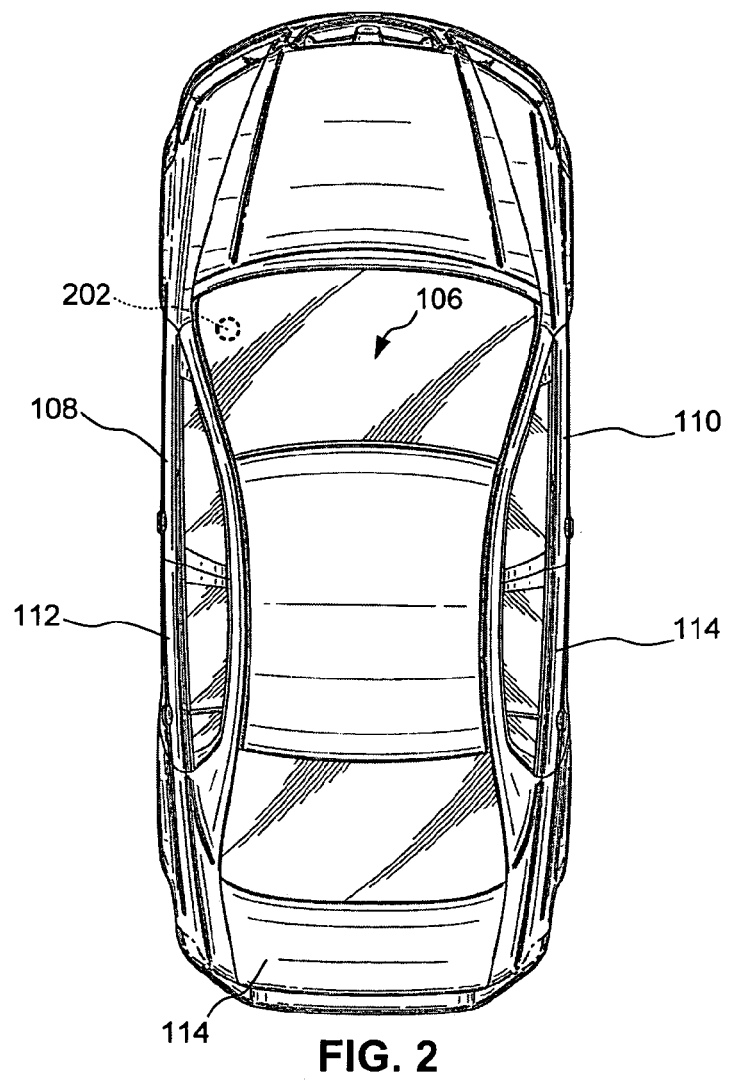
FIG. 2 is a schematic diagram of a preferred embodiment of a vehicle in accordance with the present invention.

FIGS. 1 and 2 are schematic views of a preferred embodiment of a motor vehicle 100. Motor vehicle 100 includes a body 102 and at least one wheel 104. Body 102 includes a passenger cabin or interior 106 and at least one door 108 that provides access to passenger cabin 106. In the embodiment shown in FIGS. 1 and 2, motor vehicle 100 includes four doors, a left front door 108 and a right front door 110, and left rear door 112 and right rear door 114. Other embodiments can include fewer doors and still other embodiments can include additional doors.

Preferably, motor vehicle 100 includes an illumination system 300 (see FIG. 3) and at least one illumination device associated with illumination system 300. Illumination system 300 can include a number of different components. Some of these components are shown schematically in FIG. 3. These different components can be located together or throughout different locations of motor vehicle 100.

Figure 3:
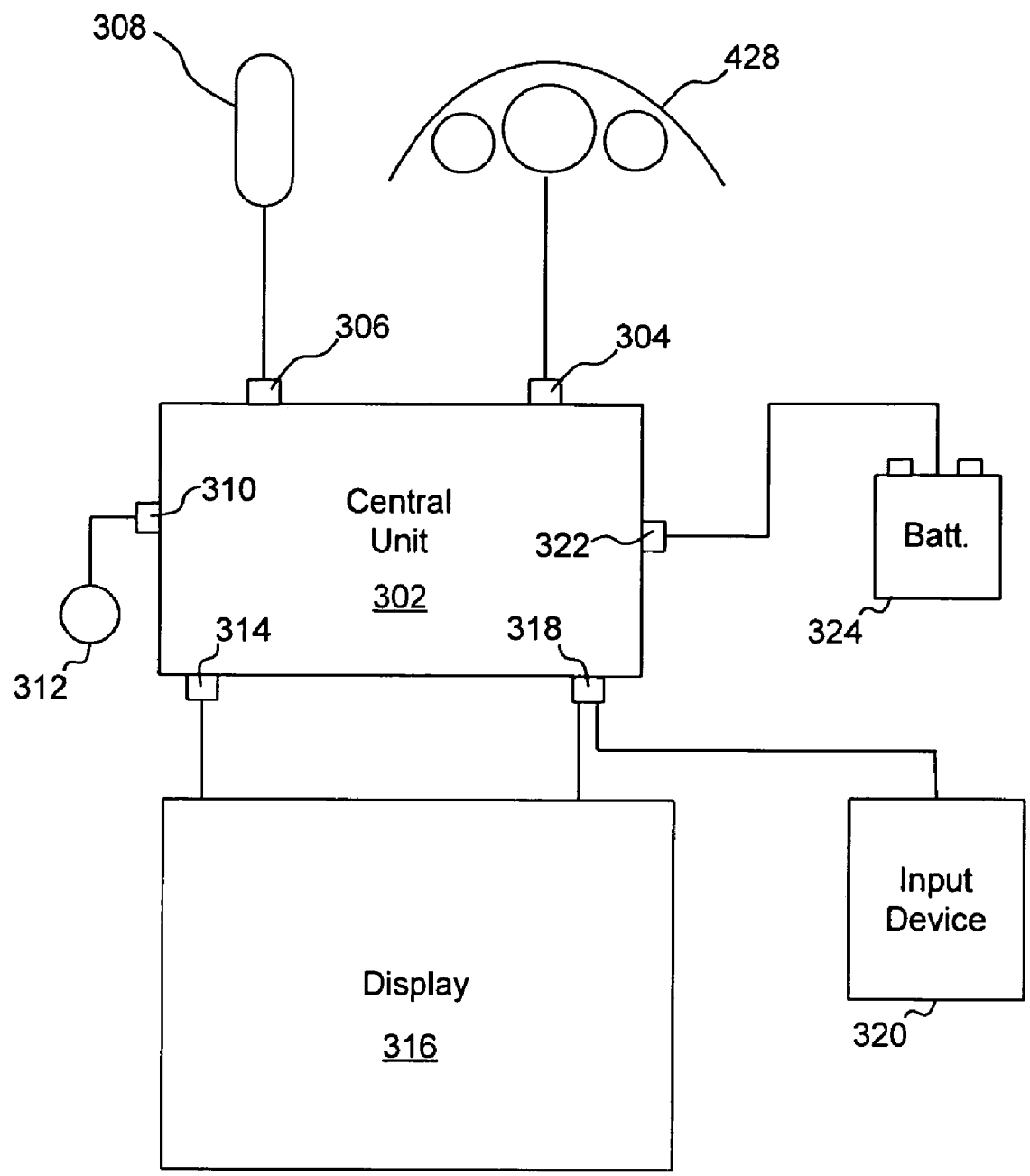
FIG. 3 is a schematic diagram of a preferred embodiment of an illumination system in accordance with the present invention.

Referring to FIG. 3, which shows a schematic diagram of a preferred embodiment of an illumination system 300, illumination system 300 includes a central unit 302. Central unit 302 preferably includes a number of inputs and outputs. Central unit 302 includes a first port 304 that is designed to send a first signal to instrument cluster 428, a second port 308 that is designed to send a second signal to at least one switch 308, and a third port 310 that is designed to receive a information from a light sensor 312.

In some embodiments, the first and second signals can be powered, meaning that the illuminated device, either instrument cluster 428 or switch 308 is actually illuminated by the output of central unit 302. In other embodiments, central unit 302 merely sends information as a signal, and that information is used by the illuminated device to attain a certain brightness level. In this embodiment, one or more of the illuminated devices are self-powered and central unit 302 provides an illumination signal. In still other embodiments, some of the illumination devices are powered by central unit 302 and other illumination devices are self-powered.

In some embodiments, central unit 302 is designed to communicate with a display 316 and provide illumination information to display 316. Display port 314 can facilitate communications between central unit 302 and display 316. Any device or component that receives illumination instructions, information and/or power from central unit 302 can be considered an illuminated component. Although only three illuminated components are provided as an example in the embodiment shown in FIG. 3, many additional elements can also receive illumination information from central unit 302. In some embodiments, fewer than the three illuminated components receive illumination information from central unit 302.

Central unit 302 can also include provisions that facilitate human interaction. To receive information from a user, central unit 302 includes an input port 318 that is capable of communicating with an input device 320. In some embodiments display 316 includes provisions for receiving information from a user, one example is a touch screen. In these embodiments, display 316 can be connected to input port 318 as well. Input device 320 can take on a number of different forms, including a dimmer switch, a thumb wheel and/or a rotary encoder. Preferably input device 320 is capable of assuming a number of different positions and has a range of motion.

A power port 322 that can connect central unit 302 to a power supply 324. In the embodiment shown in FIG. 3, power supply 324 is a battery. In some embodiments, all or most of the items shown in FIG. 3 are housed in a single case or unit. In other embodiments, the various items shown in FIG. 3 are not housed in a single physical case, but instead, are distributed throughout motor vehicle 100 and communicate with one another via known wired or wireless methods. For example, in a system where one or more items communicate wirelessly, the Bluetooth® protocol can be used. Preferably Display 316 is disposed in the passenger cabin 106 in a location where it can be viewed by passengers. Some components of illumination system 300 can be placed out of plain sight.

Figure 4:
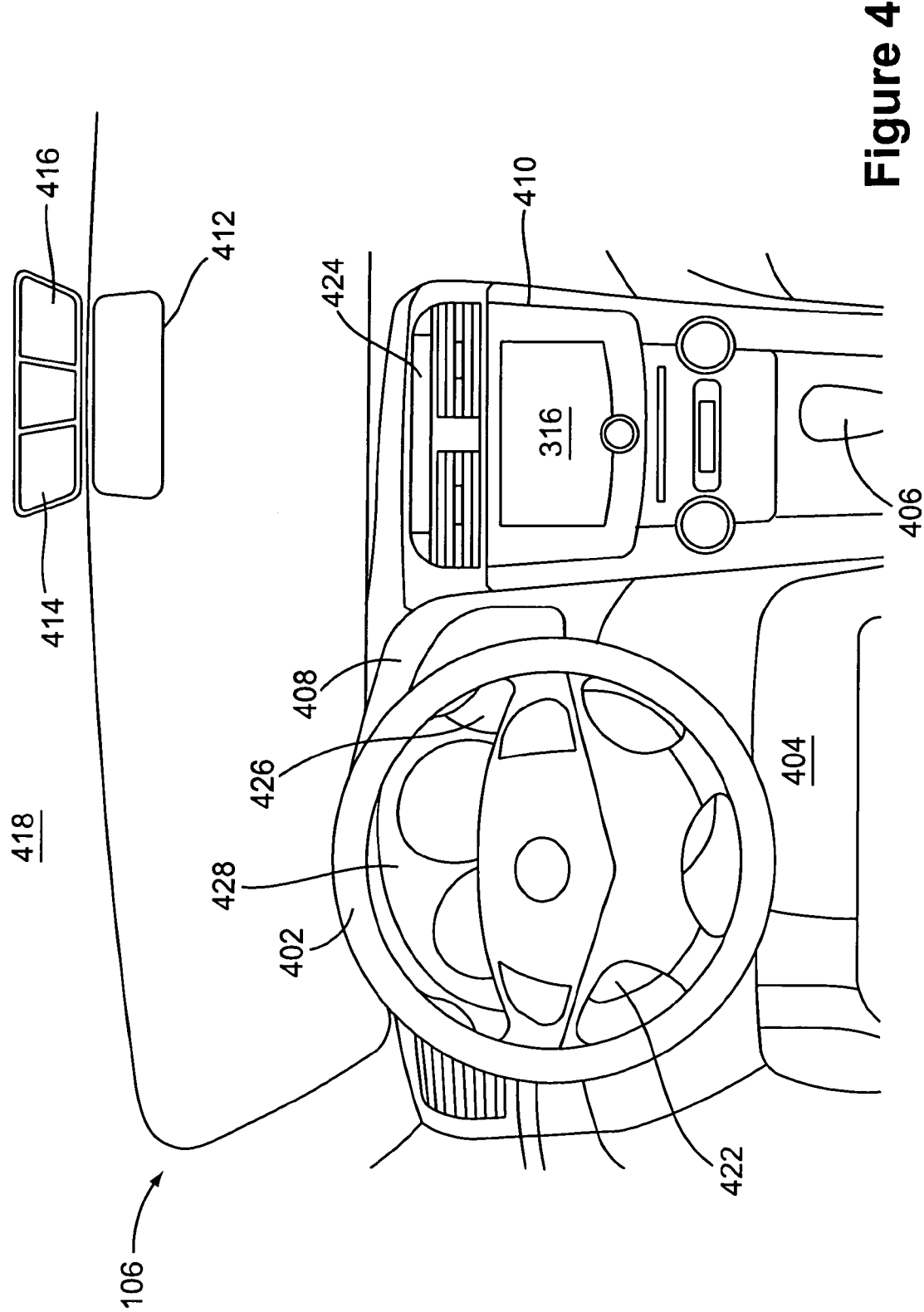
FIG. 4 is a schematic view of the interior of the motor vehicle shown in FIG. 1.

FIG. 4 shows a preferred embodiment of an interior 106 of motor vehicle 100 (see FIG. 1). Interior 106 includes a steering wheel 402, a driver's seat 404, a shifter or gear selector 406, a dashboard 408, a center console 410 and a rear view mirror 412. A control pod 422 can be mounted onto steering wheel 402.

Preferably, interior 106 includes a headliner 418, which includes a driver's map light 414 and a passenger's map light 416. Interior 106 can also include a center console 410, which can include display 316 and a Hands Free Telephone display unit 424. In addition, some embodiments include a multi-function display 426 disposed on dashboard 408. In some embodiments, multi-function display 426 is disposed within instrument cluster 428 on dashboard 408. Instrument cluster 428 can also be referred to as a Combi-meter. In addition to multi-function display 426, instrument cluster 428 can include a speedometer, tachometer and odometer. In some embodiments, instrument cluster 428 includes illuminated gauges and/or illuminated indicia on the gauge faces. These illuminated indicia can include LED's, LCD's, fluorescent elements, conventional light bulbs or other incandescent devices, and/or electro-luminescent elements.

Figure 5:
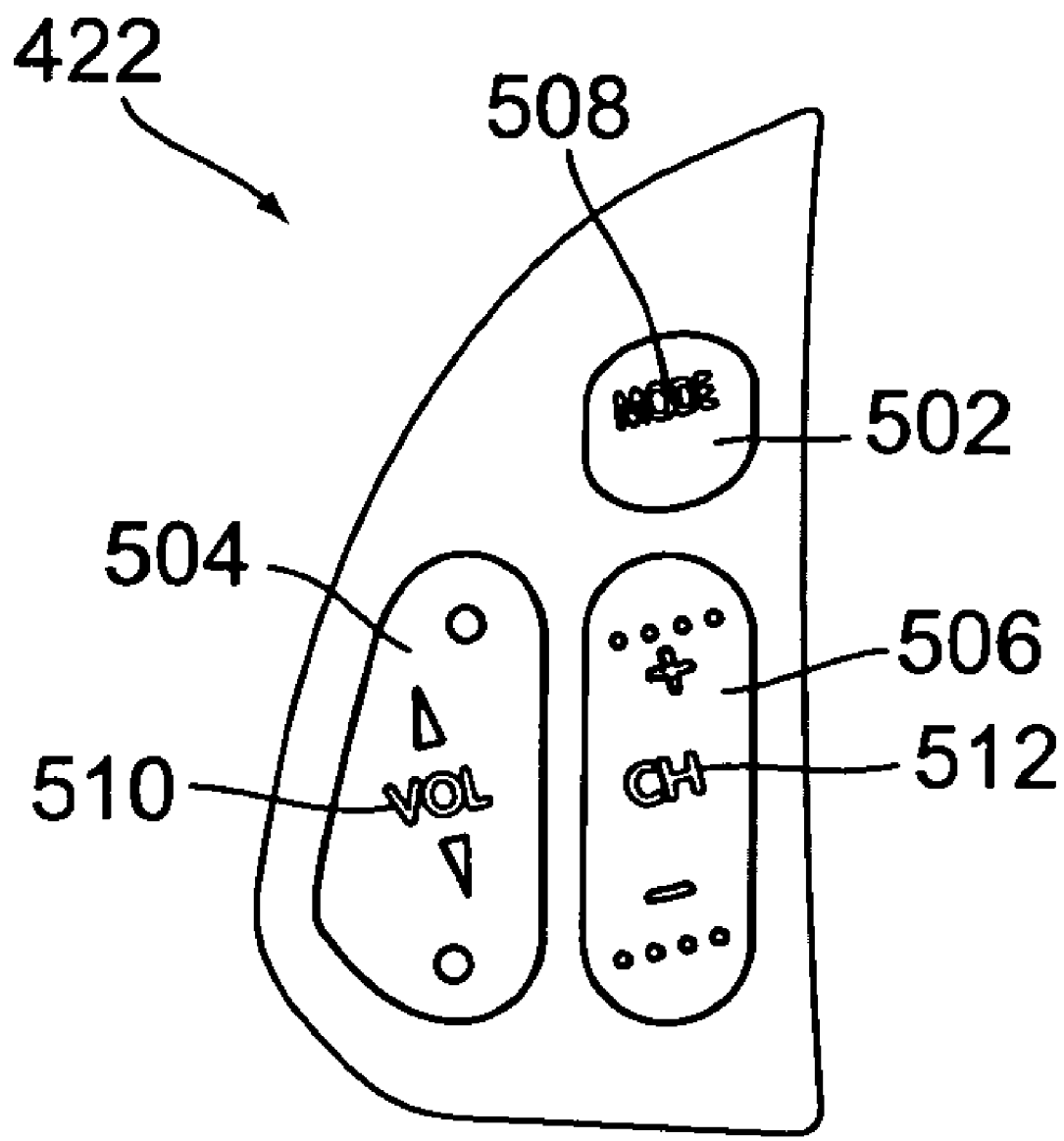
FIG. 5 is a schematic diagram of a preferred embodiment of a control pod.
Figure 14:
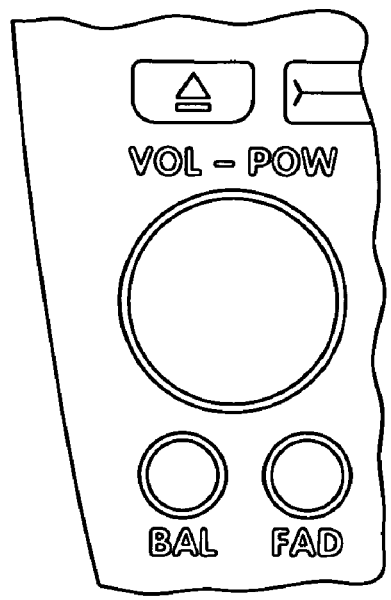
FIG. 14 is a schematic drawing showing a group of audio switches under high ambient light conditions.
Figure 15:
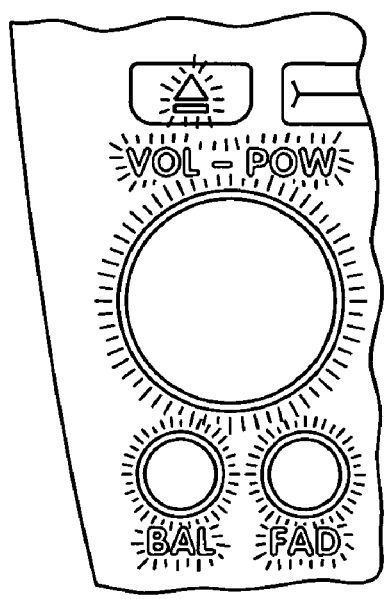
FIG. 15 is a schematic drawing showing a group of audio switches under low ambient light conditions.

FIG. 5 is an enlarged schematic diagram of control pod 422, which preferably includes a number of switches. Pod 422 includes mode button 502, volume switch 504 and channel switch 506. Preferably, mode button 502 includes mode indicia 508, volume switch 504 includes volume indicia 510 and channel switch includes channel indicia 512. In a preferred embodiment, all of the indicia can be illuminated, and in an exemplary embodiment, all of the indicia are backlit. The switches shown in control pod 422 are representative of other switches that can be disposed within interior 106 of motor vehicle 100. Other switches include power window switches, power lock switches, audio control switches, headlight and fog light switches to name a few. An example of a group of audio switches is shown in FIGS. 14 and 15. FIG. 14 is an example of a group of audio switches under high ambient illumination conditions, like day time, and FIG. 15 is an example of a group of audio switches under low ambient illumination conditions, like night time. It can be observed that the audio switches in FIG. 15 are illuminated. One or more of these switches can be controlled by control unit 302. In the embodiment shown in FIG. 3, one or more of the switches are represented schematically by switch 308.

The switches can be illuminated in many different ways. The switches can include LED's, LCD's, fluorescent elements, conventional light bulbs or other incandescent devices, and/or electroluminescent elements. Different switches associated with motor vehicle 100 can be illuminated in different ways and with different kinds of devices.

Figure 6:
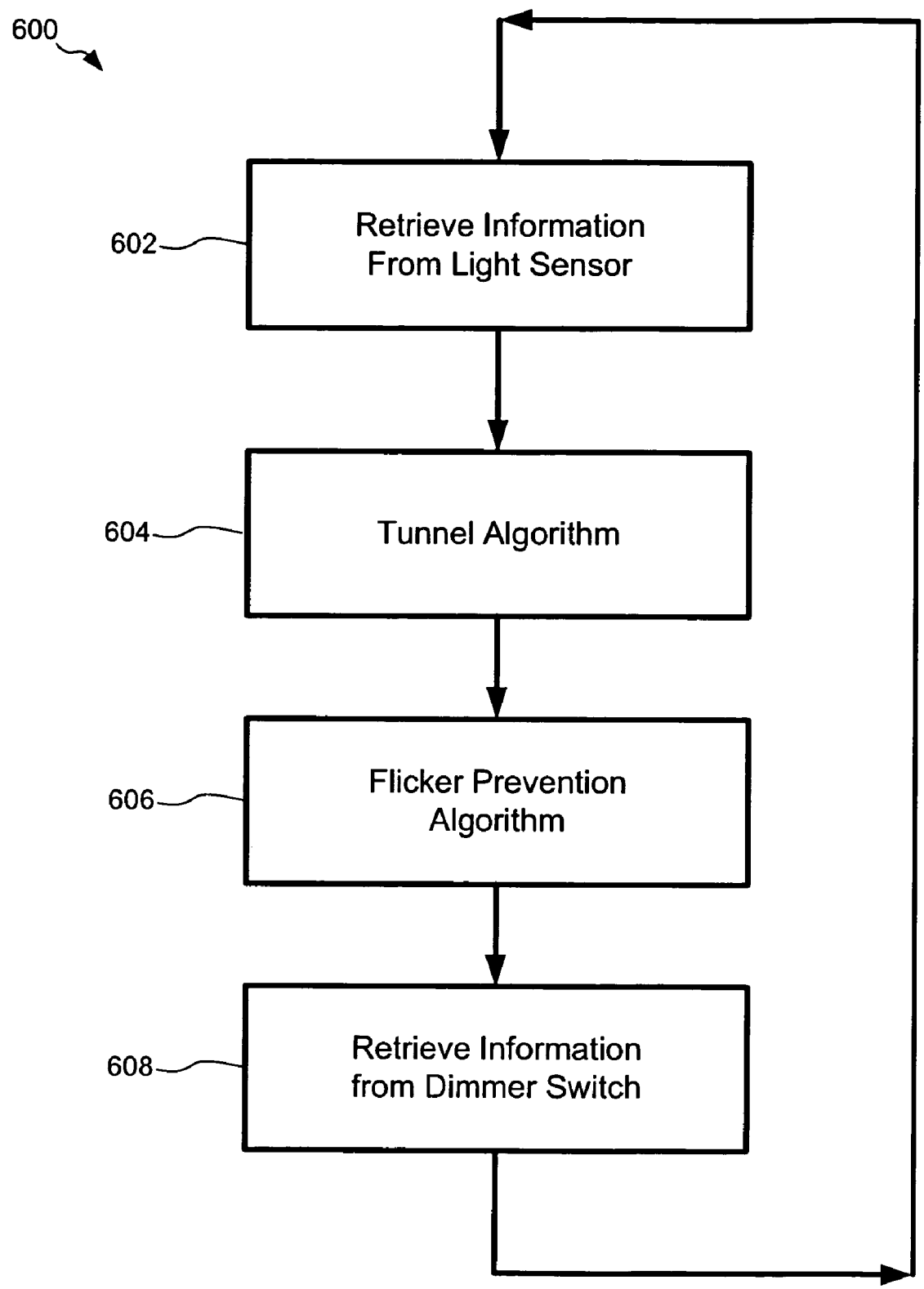
FIG. 6 is a flow diagram of a preferred embodiment of a method for determining interior illumination levels.

FIG. 6 is flow diagram of a preferred embodiment of a method for determining one or several interior illumination levels. The method can include one, several or all of the following optional steps. Each of the following optional steps can be used alone or in combination with other steps or features. The steps can be placed in any desired order.

The first step is to retrieve information from a light sensor. Preferably, this light sensor is used to detect the amount and brightness of ambient light. Information related to the light sensor can be used by one or more of the following steps.

The second step 604 includes a tunnel algorithm. This algorithm can be used to improve the response of the interior illumination system 300 when entering or exiting a particularly dark condition, for example, a tunnel.

The third step 606 includes a flicker prevention algorithm. This third step 606 can be used to prevent components of interior illumination system 300 from flickering or rapidly switching on and off under rapidly varying lighting conditions. One example of a rapidly varying lighting condition is when motor vehicle 100 is traveling through a city with tall buildings. As motor vehicle 100 moves through the city, motor vehicle 100 can drive into and out of the shadows created by the tall buildings. Without this optional third step 606, driving through these successive shadows can cause components of interior illumination system 300 to flicker on and off. Optional third step 606 can help to prevent this flicker.

In the fourth optional step 608, information from a user is retrieved. In some embodiments, a dimmer switch or dimmer dial is used to receive information regarding a desired illumination level from a user. In some cases, the dimmer switch includes a rotary encoder. This information is then used to help determine the final interior illumination level or levels.

In some embodiments, all of the different components if interior illumination system 300 are controlled or adjusted in the same way. In other embodiments, different components are controlled or adjusted separately or independently from other components of interior illumination system 300. Because of this, it is possible to apply each of the following optional steps to the same or different components of interior illumination system 300. For example, it is possible to apply only second step 604 to instrument cluster 428 and none of the other steps 606 or 608 to the illumination control of instrument cluster 428. In another example, it is possible to apply third step 606 and fourth step 608 to display 316 while first step 604 is not applied to screen 316.

It is also possible to apply one, several or all of the steps to one of the illumination components of a particular interior illumination system and to apply one several or all of the optional steps to a second illumination component in the same system. In other words, each component of interior illumination system 300 can be tailored with a particular illumination output by selecting and choosing among the optional steps and applying only those desired steps to that illumination component.

Figure 7:
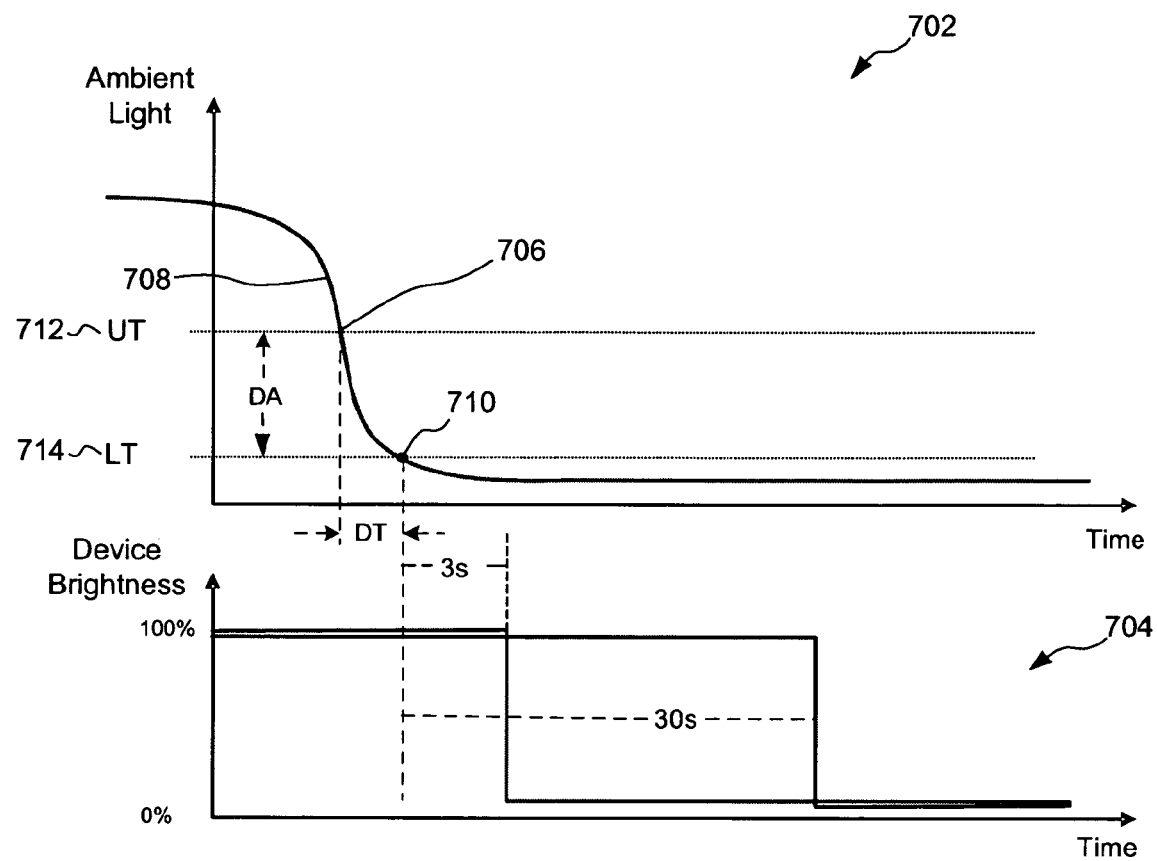
FIG. 7 is a graph of a preferred embodiment of a sensor over a certain period of time.
Figure 8:
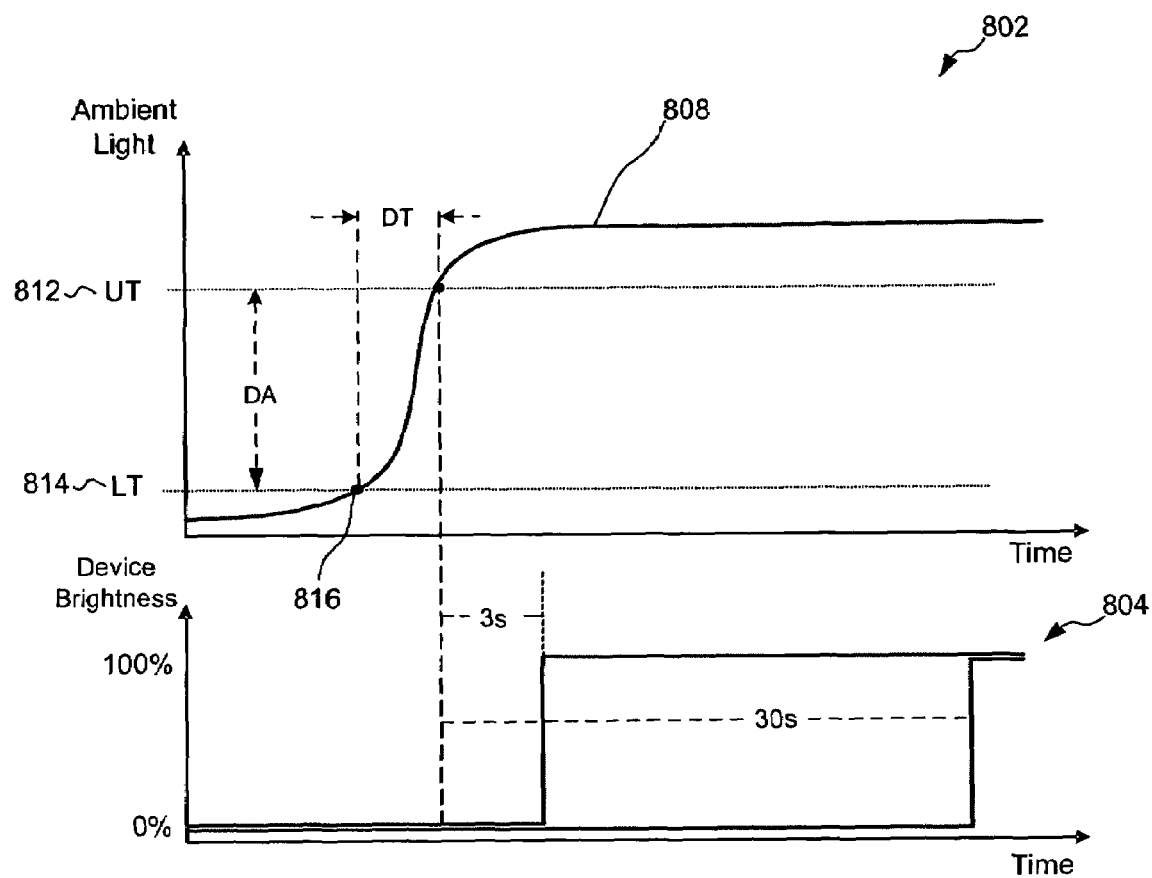
FIG. 8 is a graph of a preferred embodiment of a sensor over a certain period of time.

The second optional step 604, which relates to a tunnel algorithm, and can be understood in connection with a series of graphs shown in FIGS. 7 and 8. FIG. 7 is a graph of an example response curve of ambient light sensor 202.

The graph shown in FIG. 7 includes an upper portion 702 and a lower portion 704. Upper portion 702 is a graph of ambient light and time. The vertical Y-axis represents ambient light and the horizontal X-axis represents time. Ambient light can be measured in a variety of different ways. Preferably, light sensor 202 is used to measure ambient light. In some embodiments, light sensor 202 provides a voltage output that is related to ambient light. In these embodiments, the vertical Y-axis can relate to the voltage output of light sensor 202. Lower portion 704 is a graph showing the brightness of an illuminated device over time.

Upper portion 702 includes ambient light curve 708 that shows a situation where the amount of ambient light rapidly decreases over time. In this example, the amount of ambient light shown by curve 708 decreases rapidly, quickly passing upper threshold 712 at 706 and lower threshold 714 at 710. Preferably, these thresholds are used to define daytime and nighttime conditions, respectively.

In the embodiment shown in FIG. 7, any ambient light condition that is equal to or above upper threshold 712 is generally considered a daytime condition and any ambient light condition below lower threshold 714 is generally considered a nighttime condition. These limits can be used to control the illumination characteristics of various illuminated components.

In a preferred embodiment, these limits are also used to determine how quickly the illumination characteristics are changed from one illumination condition (for example, daytime) to a second illumination condition (for example, nighttime). In the example shown in FIG. 7, curve 708 represents a rapid decrease in ambient light. This can occur when motor vehicle 100 enters a tunnel, parking garage or other dark location.

Preferably, illumination system 300 (see FIG. 3) includes provisions for altering the illumination characteristics of one or more illuminated components based on the rate of change of ambient light. In a preferred embodiment, two different rates of change are used. A first rate of change is a standard mode where illumination system 300 receives information from light sensor 202, and periodically adjusts one more illumination characteristics based on the amount of available ambient light. A second rate of change is referred to as an "enter tunnel mode" where, due to the rapid rate of change, the illumination characteristics are more rapidly changed compared to standard mode.

FIG. 8 is a graph showing a preferred embodiment of an increasing ambient light condition. Like FIG. 7, FIG. 8 includes an upper portion 802 and a lower portion 804. Upper portion 802 is a graph of ambient light over time and lower portion 804 is a graph showing the brightness of an illuminated device over time. Upper portion 804 includes a vertical Y-axis that represents ambient light and the horizontal X-axis represents time.

Upper portion 802 includes ambient light curve 808. Ambient light curve 808 shows a situation where the amount of ambient light rapidly increases over time. Some examples of this are exiting a tunnel, parking garage or other dark location into daylight. In this example, the amount of ambient light increases until upper limit threshold 812 is reached.

As ambient light increases, curve 808 crosses two predetermined thresholds. The first threshold 814 is a lower limit and the second threshold 812 is an upper limit. Preferably, these limits are used to define nighttime and daytime conditions, respectively.

In some embodiments, these limits are also used to determine how quickly the illumination characteristics are changed from one illumination condition to a second illumination condition. In some embodiments, the upper and lower thresholds 712 and 714, respectively, associated with a rapidly decreasing ambient light condition, for example, ambient light curve 706 in FIG. 7 are different than the upper and lower thresholds 812 and 814 associated with a rapidly increasing ambient light condition, for example, ambient light curve 808 in FIG. 8. In some embodiments, the thresholds are similar. Preferably, however, the upper and lower thresholds are different for a rapidly increasing light condition and a rapidly decreasing light condition.

Preferably, illumination system 300 (see FIG. 3) includes provisions for altering the illumination characteristics of one or more illuminated components based on the rate of change of ambient light. In a preferred embodiment, two different rates of change are used. A first rate of change is a standard mode where illumination system 300 receives information from light sensor 202, and periodically adjusts one more illumination characteristics based on the amount of available ambient light. A second rate of change is referred to as an "exit tunnel mode" or an "enter tunnel mode" where, due to the rapid rate of change, the illumination characteristics are more rapidly changed compared to standard mode.

Figure 9:
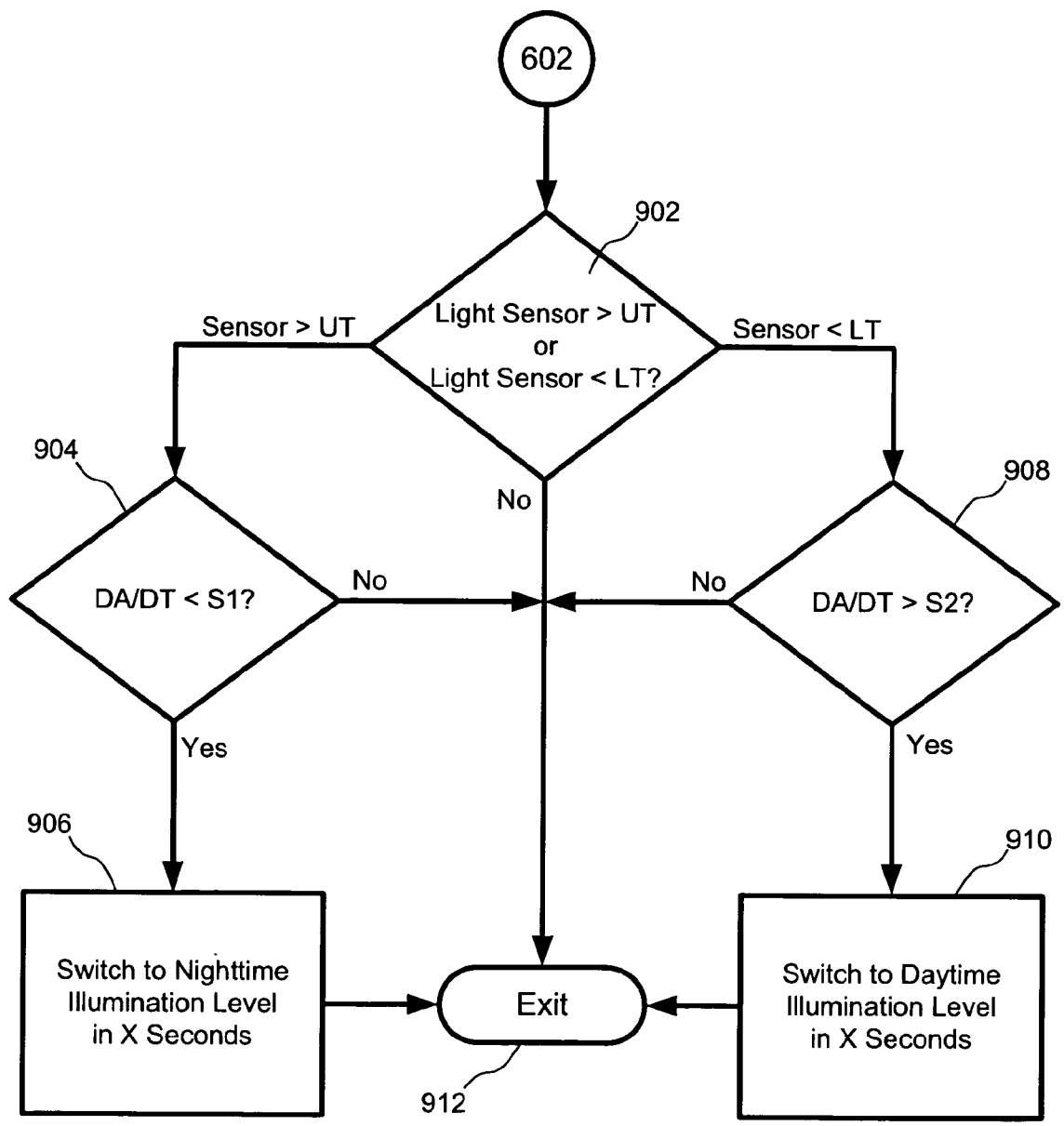
FIG. 9 is a flow diagram of a preferred embodiment of a method for adjusting an illumination level.
Figure 10:
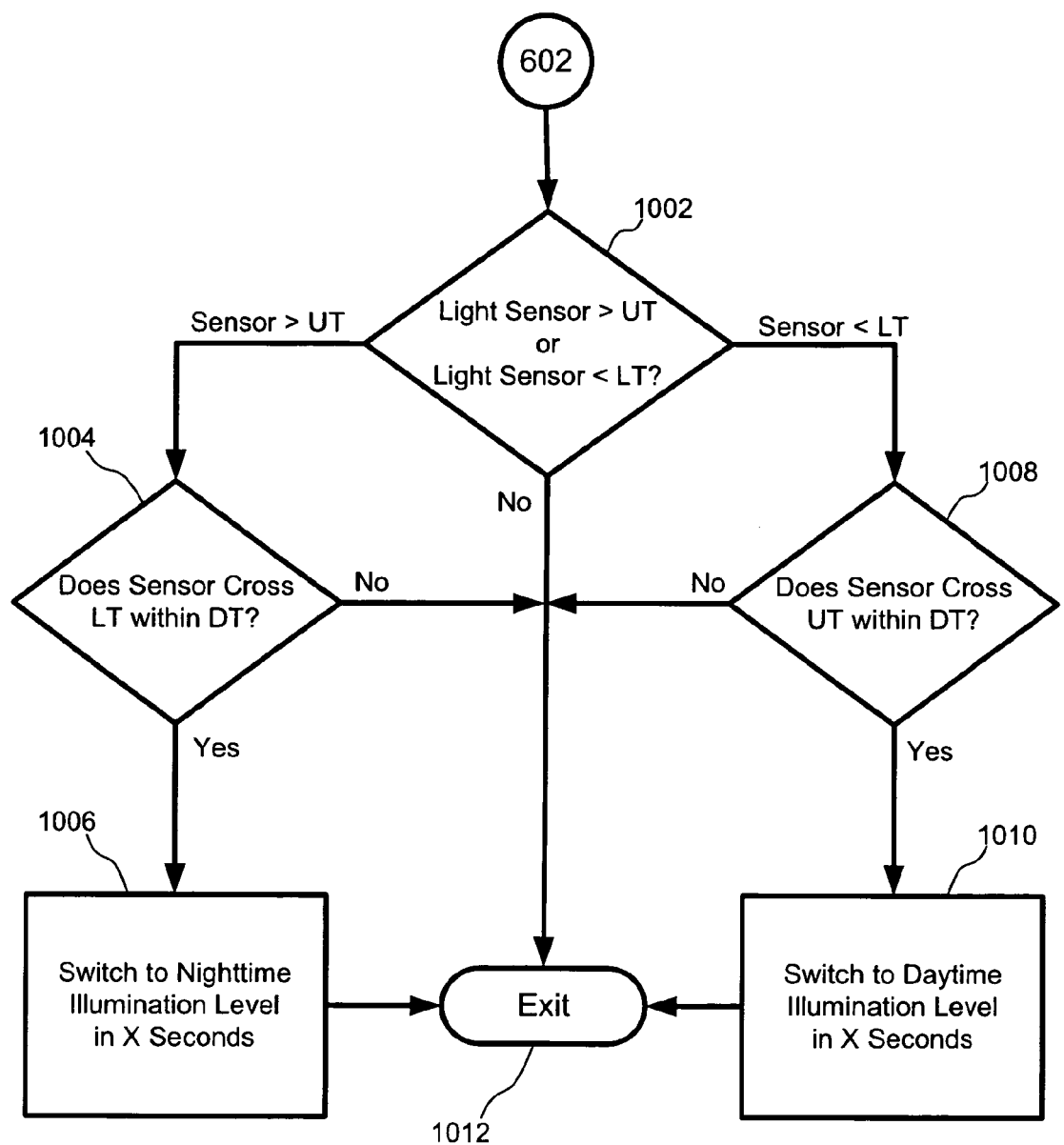
FIG. 10 is a flow diagram of a preferred embodiment of a method for adjusting an illumination level.

The operation of the two mode system will be disclosed in connection with FIGS. 9 and 10. FIG. 9 is an embodiment of a method for selecting how rapidly to change an illumination condition. Referring to FIGS. 2, 3 and 7-9, the method shown in FIG. 9 starts with step 602 (see FIG. 6), where information is retrieved from light sensor 202. In step 902, the method determines if the amount of ambient light indicated by light sensor 202 is above upper threshold 712 or below lower threshold 814. Recall that, in a preferred embodiment, the upper threshold 712 associated with the "enter tunnel mode" is different than the upper threshold 812 associated with the "exit tunnel mode" and the lower threshold 714 associated with the "enter tunnel mode" is different than the lower threshold 814 associated with the exit tunnel mode." In this embodiment, upper threshold 712 is used and lower threshold 814 is used, however, any combination of thresholds can be used in various different embodiments.

If the method determines that the amount of light indicated by light sensor 202 is above upper threshold 712, then the method determines how quickly the ambient light condition is decreasing in step 904. Preferably, central unit 302 receives a continuous stream of information, a nearly continuous stream of information, from light sensor 202, or constantly monitors light sensor 202. In any case, central unit 302 is preferably able to calculate the rate of change of light sensor 202.

The rate of change of ambient light can be determined in a number of different ways. In one embodiment, the rate of change of ambient light is determined by calculating the rate of change between two thresholds, upper threshold 712 and lower threshold 714. In the embodiment shown in FIG. 7, DA represents the change in ambient light and DT represents the change in time. The rate of change of ambient light can be calculated as DA/DT. This is likely going to be a negative number.

The calculated rate of change of ambient light can then be compared with a predetermined rate of change of ambient light value. In some embodiments this predetermined rate of change of ambient light value is a value that represents a rapid rate of change. Preferably illumination system 300 compares the calculated rate of change of ambient light with the predetermined rate of change of ambient light.

Returning to step 904, if the change in ambient light (DA) for a given period of time (DT) is less than a first slope (S1), then the system determines that motor vehicle 100 was originally in daylight, but has entered a tunnel or other dark location. In other words, if the calculated rate of change of ambient light (in absolute value terms) is greater than the predetermined rate of change of ambient light (in absolute value terms), then the system determines that an enter tunnel condition has been satisfied. This can be observed by considering curve 708 in FIG. 7. Notice that the initial ambient light condition of second curve 708 is above upper limit 712. At point 706, second curve 708 crosses upper limit 712 and begins to rapidly decrease. In the example shown in FIG. 7, the rate of this decrease (DA/DT) is less than the predetermined rate of decrease (S1). It should be noted that, because the rates are decreasing in FIG. 7, the actual value of those rates are negative. If the absolute value of the respective rates are considered, the absolute value of (DA/DT) must be greater than the absolute value of the predetermined rate of decrease (S1) for the condition expressed in 904 to be satisfied.

If the change in ambient light criteria is met in step 904, the method proceeds to step 906 where central unit 302 switches one or more illuminated components to a nighttime illumination level in X seconds. Preferably, X seconds is shorter than the time it takes central unit 302 to normally switch to a nighttime illumination level under normal, gradual circumstances. In a preferred embodiment, X can range between 0.5 seconds and 6 seconds, and in an exemplary embodiment, X is about 3 seconds. In contrast, central unit 302 preferably includes a normal response time, which can take anywhere from 15 seconds to 90 seconds to enter a nighttime mode when there is a gradual decrease in the ambient light level. In an exemplary embodiment, central unit 302 takes about 30 seconds to change the illumination characteristics of an illuminated component when there is a gradual decrease in the ambient light level.

Lower portion 704 is a graph of brightness and time. The vertical axis of lower portion 704 is brightness expressed as a percentage of total maximum brightness. Lower portion 704 shows a comparison of the two exemplary embodiments, where X is about 3 seconds and the normal response time is about 30 seconds. Comparing the special response time of step 906, about 3 seconds in an exemplary embodiment, with the normal response time, about 30 seconds in an exemplary embodiment, the advantage of the special response time of step 906 can be readily observed. In the exemplary embodiment, the method shown in FIG. 9 can improve the response time of an illuminated device by about 27 seconds when motor vehicle 100 experiences a rapid change in ambient illumination.

After one or more of the illuminated components has been switched into nighttime mode, the method proceeds to step 912 where the method exits the algorithm.

Returning to step 902, if light sensor 202 indicates that the amount of ambient light is in between upper threshold 712 and lower threshold 814, then the method proceeds to step 912 and exits the algorithm. However, if the amount of ambient light is less than lower limit 814, indicating a dark or nighttime condition, the method proceeds to step 908 where the rate of change of ambient light is considered. In step 908, the method determines the rate of change of ambient light. This can be observed in FIG. 8 where curve 808 shows a rapidly increasing ambient light condition.

In step 908, if the change in ambient light (DA) for a given period of time (DA) is greater than a second slope (S2), then the system determines that motor vehicle 100 was originally in a dark location, like a tunnel or parking garage and has suddenly entered daylight. This can be observed by considering curve 808 of FIG. 8. Notice that the initial ambient light condition of second curve 808 is below lower limit 814. At point 816, second curve 808 crosses lower limit 814 and begins to rapidly increase.

The rate of increase of ambient light can be determined in a number of different ways. In one embodiment, the rate of change of ambient light is determined by calculating the rate of change between two thresholds, lower threshold 814 and upper threshold 812. In the embodiment shown in FIG. 8, DA represents the change in ambient light and DT represents the change in time. The rate of change of ambient light can be calculated as DA/DT.

DA/DT can be compared with a predetermined rate of increase expressed as S2. In some embodiments, the rate of change DA/DT can be compared with S2 and if the rate of change of ambient light is greater than the predetermined rate of change (S2), then illumination system 300 determines that motor vehicle 100 is experiencing a rapid increase in ambient light levels. In some cases this can be referred to as an "exit tunnel" condition.

Returning to FIG. 9, if the rate of increase meets the predetermined criteria, then the method proceeds to step 910 where central unit 302 switches one or more illuminated components to a daytime illumination level in X seconds. Preferably, X seconds is shorter than the time it takes central unit 302 to normally switch to a daytime illumination level under normal, gradual circumstances. In a preferred embodiment, X can range between 0.5 seconds and 6 seconds, and in an exemplary embodiment, X is about 3 seconds. In contrast, central unit 302 can normally take anywhere from 15 seconds to 90 seconds to enter a daytime mode when there is a gradual increase in the ambient light level. In an exemplary embodiment, central unit 302 takes about 30 seconds to change the illumination characteristics of an illuminated component when there is a gradual decrease in the ambient light level. After step 910, the process moves to step 912, where the tunnel algorithm is exited.

Lower portion 804 shows a comparison of the two exemplary embodiments where X is about 3 seconds and the normal response time is about 30 seconds. Comparing the special response time of step 910, about 3 seconds in an exemplary embodiment, with the normal response time of about 30 seconds in an exemplary embodiment, the advantage of the special response time of step 910 can be readily observed. In the exemplary embodiment, the method shown in FIG. 9 can improve the response time of an illuminated device by about 27 seconds when motor vehicle 100 experiences a rapid change in ambient illumination.

FIG. 10 is a flow diagram of an alternate embodiment of the method shown in FIG. 9. The flow diagram of FIG. 10 is substantially similar to the flow diagram shown in FIG. 9 except for steps 1004 and 1008. In step 1004, instead of considering the rate of change, step 1004 considers the time it takes for the ambient light level to move from upper limit 712 to lower limit 714. If the level of ambient light is able to move from upper limit 712 to lower limit 714 in a predetermined period of time, for example, 1 to 3 seconds, then the method determines that motor vehicle 100 has suddenly entered a dark location and the method proceeds to step 1006 where the illumination characteristics are rapidly changed. A timer can be started when the ambient light level crosses the upper limit 712 and stopped when the lower limit 714 is reached. The elapsed time can be compared with the predetermined time.

Likewise, in step 1008, the system determines how long it takes for the ambient light level to move from lower limit 814 to upper limit 812. If the ambient light level moves from lower limit 814 to upper limit 812 in a predetermined period of time, for example, 1 to 3 seconds, then the system determines that motor vehicle 100 has suddenly moved from a dark location to a brightly lit environment and the method moves to step 1010 where one or more illumination characteristics are rapidly changed. A timer can be started when the ambient light level crosses the lower limit 812 and stopped when the upper limit 814 is reached. The elapsed time can be compared with the predetermined time. In all other respects, the embodiment shown in FIG. 10 is similar to the embodiment shown in FIG. 9.

In some embodiments, a flicker prevention feature can be used. This feature can be used alone or with other features and this feature can be applied to one, several or all interior illumination sources or illumination devices. This feature is used to prevent an illumination source or device from flickering rapidly as ambient lighting conditions change rapidly. An example of this is if vehicle 100 (see FIG. 1) is traveling through a city with tall buildings. The tall buildings may cast shadows and as vehicle 100 travels into and out of the shadows of those tall buildings, the ambient lighting conditions will change rapidly.

Without a flicker prevention feature, it is possible that an interior illumination source will respond quickly to the rapid changes in ambient lighting conditions and will appear to flicker, possibly causing a distraction to the driver and reducing legibility.

Figure 11:
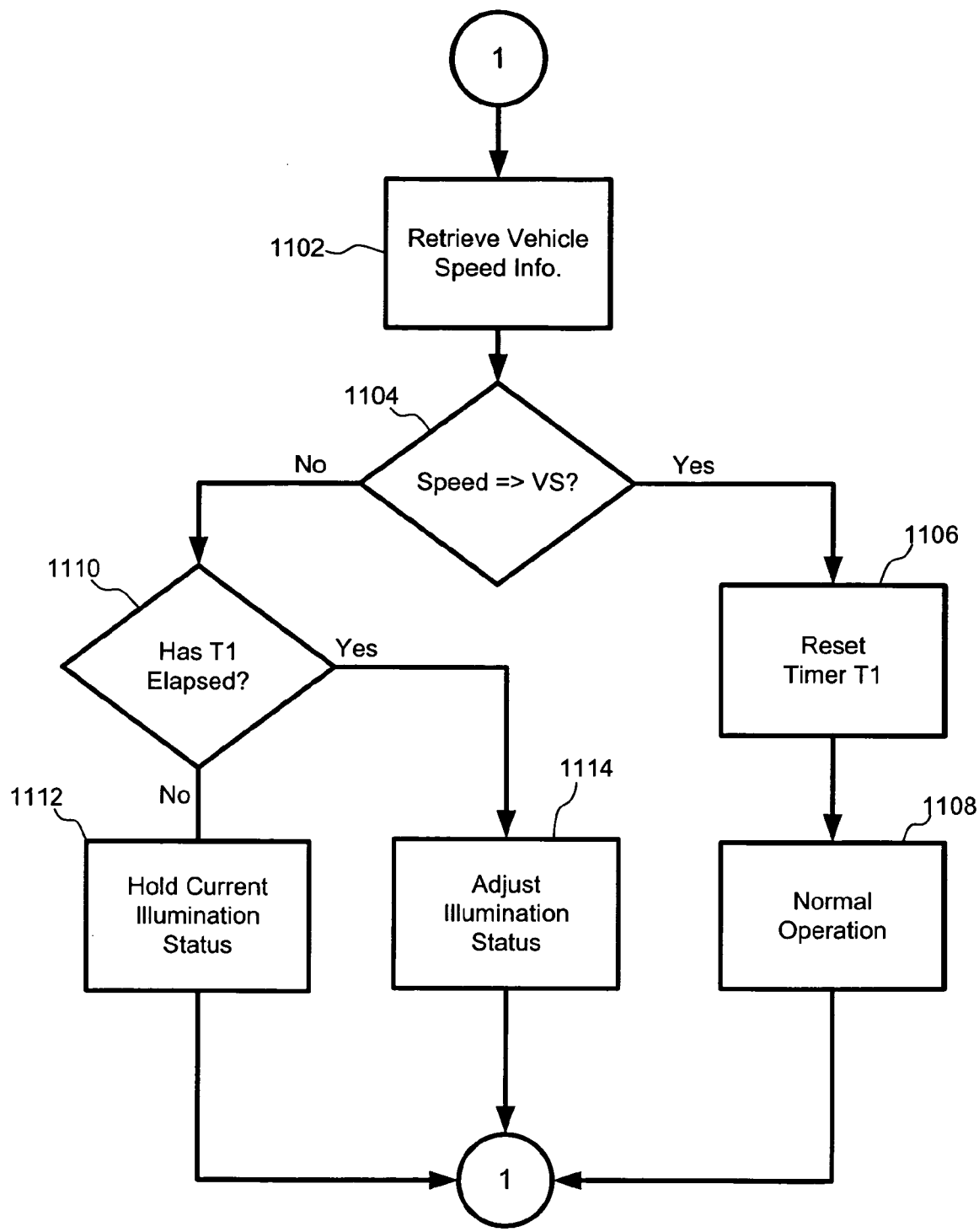
FIG. 11 is a is a flow diagram of a preferred embodiment of a method for reducing flicker.

FIG. 11 is a flow diagram of a preferred embodiment of a flicker prevention method. The method begins by retrieving vehicle speed information in step 1102. This vehicle speed information can come from a number of different sources, including a speedometer, a computer or some other kind of velocity sensor. After the speed of vehicle 100 (see FIG. 1) has been determined, the process determines if the vehicle speed is less than a predetermined speed VS, in step 1104.

The speed VS can be any desired speed. Preferably, VS is selected so that at speeds above VS, flicker is not likely to be a problem. For example, if motor vehicle 100 is moving at highway speeds, around 100 kilometers per hour or about 62 miles per hour, shadows cast by buildings, trees or other objects would cause the ambient lighting conditions to change faster than illumination system 300 is adapted to respond. At these speeds, the inherent response time of illumination system 300 can be used to prevent flicker. As the vehicle speed is reduced, illumination system 300 will eventually be able to respond to the changing ambient lighting conditions. VS is preferably selected so that at speeds below VS, flicker of at least one interior illumination device becomes a problem and flicker prevention is desirable. Preferably, VS is between about 1 to 30 kilometers per hour. In some embodiments, VS is between 2 and 15 kilometers per hour. In an exemplary embodiment, VS is about 7 kilometers per hour.

Returning to the process shown in FIG. 11, if the process determines that the current speed of motor vehicle 100 is greater than or equal to VS, then the process moves to step 1106 where timer T1 is reset. After timer T1 has been reset, the process moves to step 1108, where normal operation of illumination system 300 occurs. The process then returns to step 1102 where vehicle speed information is retrieved.

Returning to step 1104, if the process determines that the current speed of motor vehicle 100 is less than VS, then the process moves to step 1110. At this step, the process determines if timer T1 has elapsed. Recall that timer T1 is reset in step 1106 when the speed of motor vehicle 100 is greater than or equal to VS. Another way to understand the operation of decision step 1104 and the operation of timer T1 is to observe that timer T1 is constantly being reset if the speed of motor vehicle 100 is greater than or equal to VS. So, when the speed of motor vehicle 100 falls below VS, then timer T1 is started.

In step 1110, if timer T1 has not elapsed, then the process moves to step 1112, the current illumination status is maintained. Again, this could be applied to one, several or all interior illumination devices or sources. The process moves to step 1114 from step 1110 when timer T1 has elapsed. In step 1114, the illumination level of the desired illumination device or source is adjusted. Preferably, the adjustment made in step 1114 is immediate.

The following example can be used to understand the operation of this flicker prevention process. Motor vehicle 100 is moving at a high rate of speed, for example, at highway speeds. In this condition, decision step 1104 is constantly moving the process to step 1106 and timer T1 is constantly being updated. As motor vehicle 100 slows down and speed is reduced to a speed that is less than VS, the process, in steps 1110, 1112 and 114, uses delay timer T1 to delay changing one or more interior illumination levels. This delay timer can help reduce flicker if motor vehicle 100 is rapidly experiencing changes in ambient lighting conditions.

Timer T1 is preferably used as the flicker prevention delay timer. In some embodiments, illumination system 300 includes an inherent delay. In some embodiments, this inherent delay is caused by averaging a number of different sensed ambient light values to arrive at an average ambient light level. In some embodiments, the inherent delay is intentionally provided so that illumination devices or sources associated with illumination system 300 do not respond to every minute change in ambient lighting conditions. Comparing any inherent delay with the duration of timer T1, timer T1 preferably has a longer duration than the inherent delay of illumination system 300 under normal circumstances. Considering the preferred embodiment shown in FIG. 11, this generally means that timer T1 has a longer duration than the inherent illumination response time of normal operation step 1108.

The inherent delay duration and timer T1 can be set to any desired time duration. In some embodiments, timer T1 is set at between about 20 seconds to 120 seconds. In an exemplary embodiment, timer T1 is set to about 60 seconds. The inherent delay duration can also be set to any desired time duration. In some embodiments, inherent delay duration is set at any time duration up to 60 seconds. This means that, in some embodiments, there is no lower limit and there is no intentional delay provided and the illumination system 300 response time is relatively immediate or as fast as illumination system 300 is able to respond to a change in ambient lighting conditions. The time duration for the inherent delay can extend from relatively immediate to about 60 seconds. In an exemplary embodiment, the inherent delay is set at about 30 seconds. Thus, in an exemplary embodiment, the inherent delay is set to about 30 seconds and the corresponding timer T1 is set at about 60 seconds. Many other time durations can be used for both timer T1 and the inherent delay.

Figure 12:
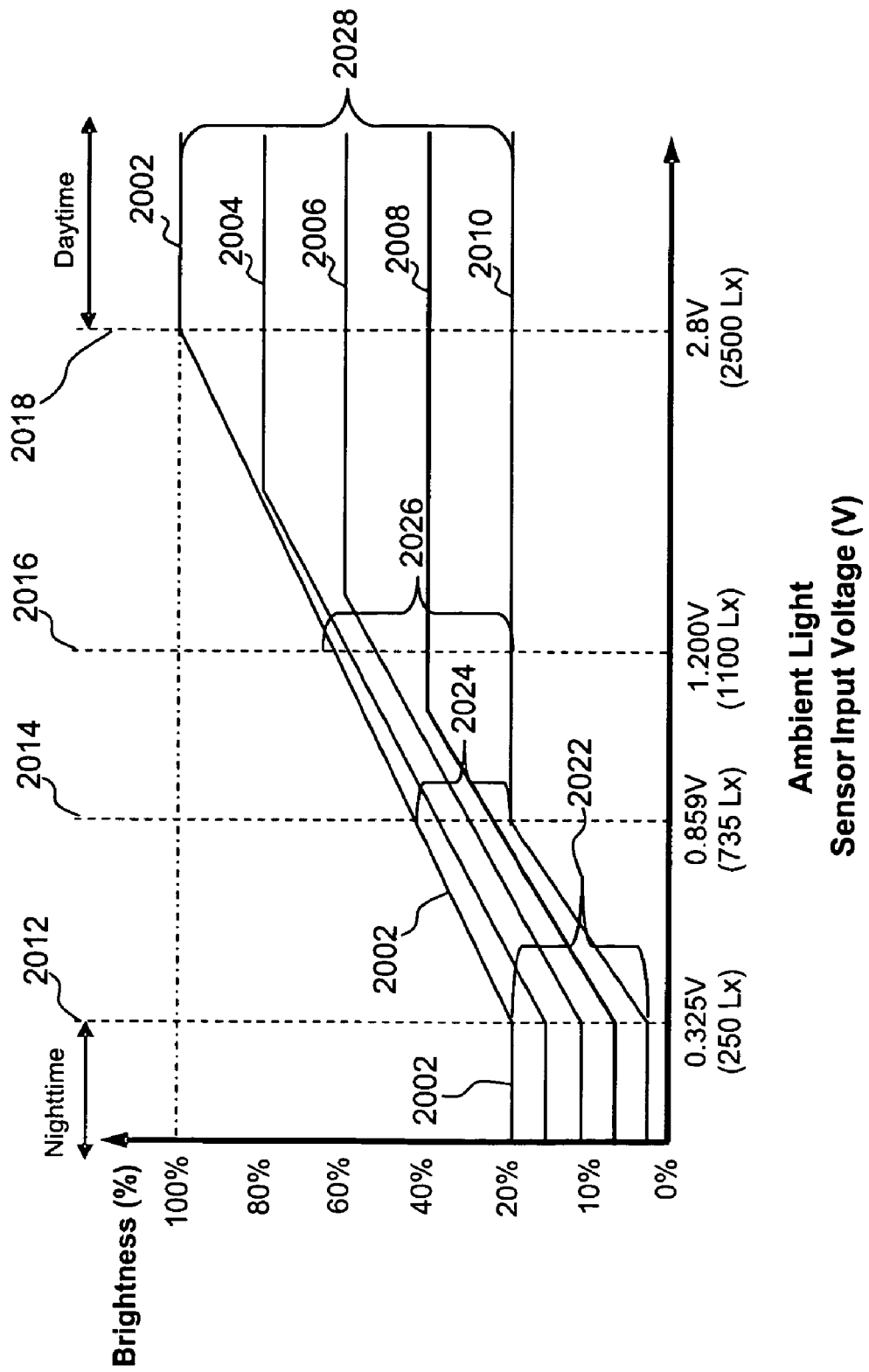
FIG. 12 is a graph of a preferred embodiment of a preselected dimmer range for various ambient light levels.

Referring to FIG. 6, some embodiments include step 608, where one or more illumination characteristics are based on information received from a user. In one embodiment, shown in FIG. 12, the brightness level of one or more illuminated components varies continuously depending on the ambient lighting conditions. Referring to FIG. 12, which is a graph of a preferred embodiment of a method for controlling the brightness level of one or more illuminated components, the graph includes a vertical Y-axis related to brightness, expressed as a percentage of maximum brightness, and an X-axis related to ambient light.

A series of curves show a preferred embodiment of a dimming pattern. The dimming pattern provides a range of available brightness depending on ambient lighting conditions. First brightness curve 2002 represents the maximum available brightness for a given ambient light condition and fifth brightness curve 2010 represents the minimum available brightness for a given ambient light condition. Second curve 2004, third curve 2006 and fourth curve 2008 are disposed between first curve 2002 and fifth curve 2010, and provide a visual aid in discerning the dimming pattern. In some embodiments, fourth curve 2008 represents a brightness level that is 25% of the maximum available brightness, third curve 2006 represents a brightness level that is 50% of the maximum available brightness, and second curve 2004 represents a brightness level that is 75% of the maximum available brightness.

The continuous brightness feature can be understood in connection with the following examples. Consider first ambient light condition 2012. This ambient light condition is about 250 Lx, and in a preferred embodiment, corresponds to sensor 202 output of about 0.325 V. In this embodiment, this ambient light condition is considered nighttime, and any ambient light condition where even less ambient light is available, is considered nighttime. At this first ambient light condition, the graph indicates a first range 2022 of available brightness. This first range extends from a minimum brightness of about 5% to a maximum brightness of about 20%. This means that, at this ambient light condition, input device 320 (see FIG. 3) can vary the brightness of an illuminated component from about 5% to 20% of this maximum possible brightness. In other words, as a user rotates or otherwise operates input device 320 from its minimum position to its maximum position, the brightness of an illuminated component will generally vary from between 5% to 20% of its maximum possible brightness. The maximum possible brightness level is shown as 100% in FIG. 12. This maximum possible brightness level can be a physical limit on the brightness level that can be achieved by the illuminated component or this can be a designed or predetermined maximum level that is lower than the physical capabilities of the illuminated component.

Second ambient light condition 2014 includes somewhat more light than first ambient light condition 2012. Second ambient light condition 2014 is a situation where about 735 Lx of ambient light is sensed by sensor 202 (see FIG. 2), which provides an output of about 0.859V, in a preferred embodiment. According to the graph shown in FIG. 12, second ambient light condition 2014 has a second range 2024 of available brightness levels. This second range extends from a minimum of about 20% to a maximum of about 40%.

Third ambient light condition 2016 includes more ambient light than second ambient light condition 2014. Third ambient light condition 2016 is a situation where about 1100 Lx of ambient light is sensed by sensor 202 (see FIG. 2), which provides an output of about 1.200V, in a preferred embodiment. According to the graph shown in FIG. 20, third ambient light condition 2016 has a third range 2026 of available brightness levels. This third range extends from a minimum of about 20% to a maximum of about 60%.

Fourth ambient light condition 2018 represents a daylight condition and includes more ambient light than third ambient light condition 2016. Fourth ambient light condition 2018 is a situation where about 2500 Lx of ambient light is sensed by sensor 202 (see FIG. 2), which provides an output of about 2.800V, in a preferred embodiment. According to the graph shown in FIG. 12, fourth ambient light condition 2018 has a fourth range 2028 of available brightness levels. This fourth range extends from a minimum of about 20% to a maximum of about 100%. According to the graph, any ambient light condition where there is more ambient light than fourth ambient light condition 2018 will have substantially the same brightness range and fourth range 2028.

It should be noted that FIG. 12 is an embodiment of a continuously variable system. The four ambient light conditions 2012, 2014, 2016 and 2018, discussed above are merely four selected points in a continuum of possible ambient lighting conditions. This means there are many ambient lighting conditions disposed between each of the four lighting conditions 2012, 2014, 2016 and 2018, and each of these other ambient lighting conditions can have its own distinctive brightness range, as shown in FIG. 12.

In some embodiments, the brightness range is computed for a particular ambient light condition. In these embodiments, the number of possible brightness ranges is nearly infinite, and limited only by the precision of sensor 202. For example, if sensor 202 is able to determine or differentially sense 100,000 discrete ambient light levels between first ambient light condition 2012 and second ambient light condition 2014, then illumination system 300 can provide 100,000 different brightness ranges between those two ambient lighting conditions.

In other embodiments, a number of different brightness ranges is selected that is less than the physical precision of sensor 202. In these embodiments, a number of different brightness ranges less than the physical precision of sensor 202, 10 to 50,000 different brightness ranges, for example, can be provided between first ambient light condition 2012 and second ambient light condition 2014.

Figure 13:
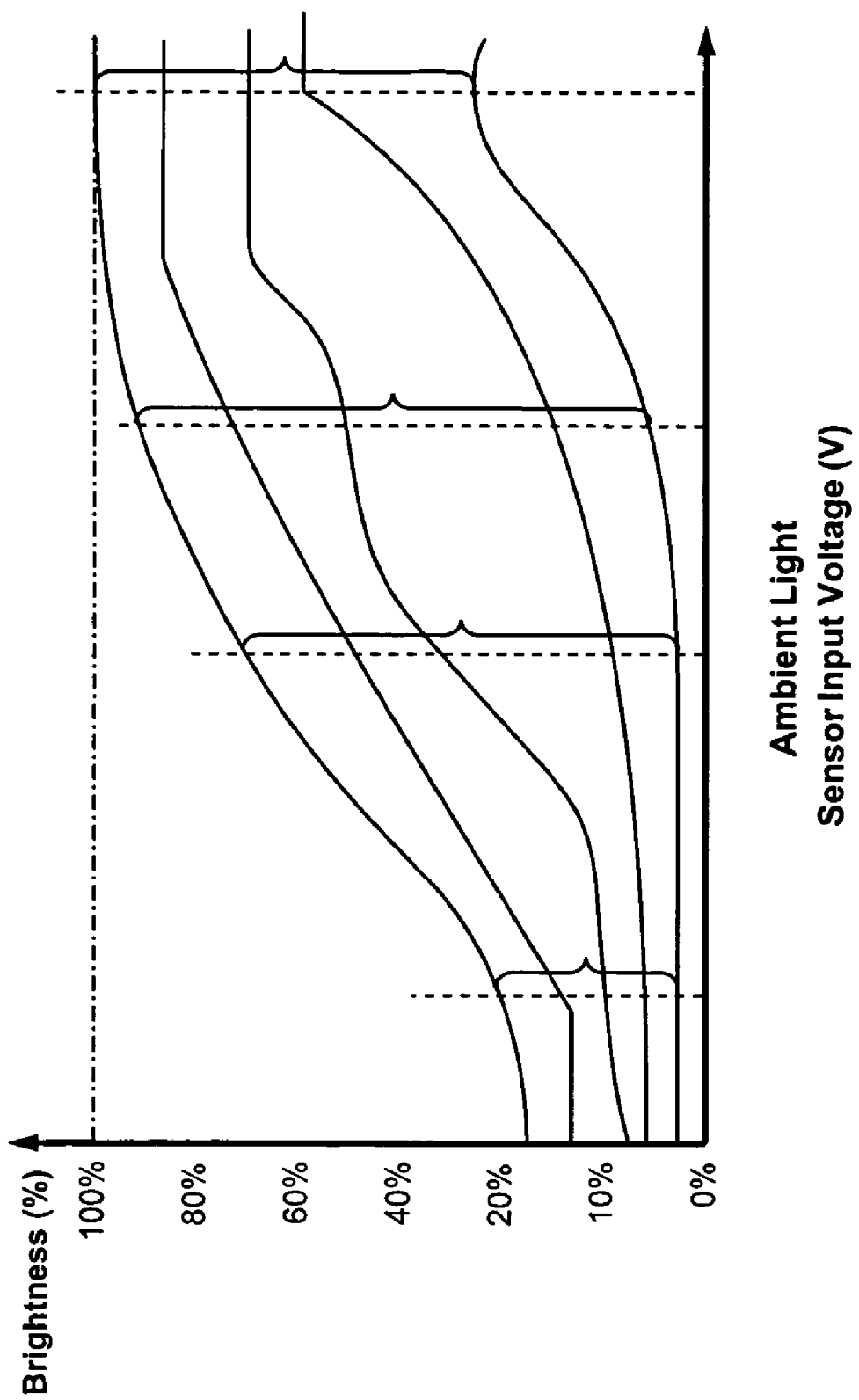
FIG. 13 is a graph of various dimming pattern curves for use in a continuously variable system.

This continuously variable system allows users to continuously vary the brightness of an illuminated component. This system also allows users to select a particular relative brightness level, for example, 30% of a given range, and the system will keep that relative brightness regardless of ambient light conditions. Other dimming patterns can be established. Some dimming patterns can include non-linear curves including exponential curves or conical section curves, as shown in FIG. 13.

Similar to other steps in FIG. 6, this step 608 related to the dimming feature, can be applied to one, several or all illumination sources associated with motor vehicle 100. For example, referring to FIG. 3, it is possible to apply this dimming feature to switch 308, instrument cluster 428 and/or display 316. If this dimming feature is applied to display 316, the brightness of display 316 can be affected, the contrast of display 316 can be affected or both the brightness and contrast of display 316 can be affected by step 608.

Figure 16:
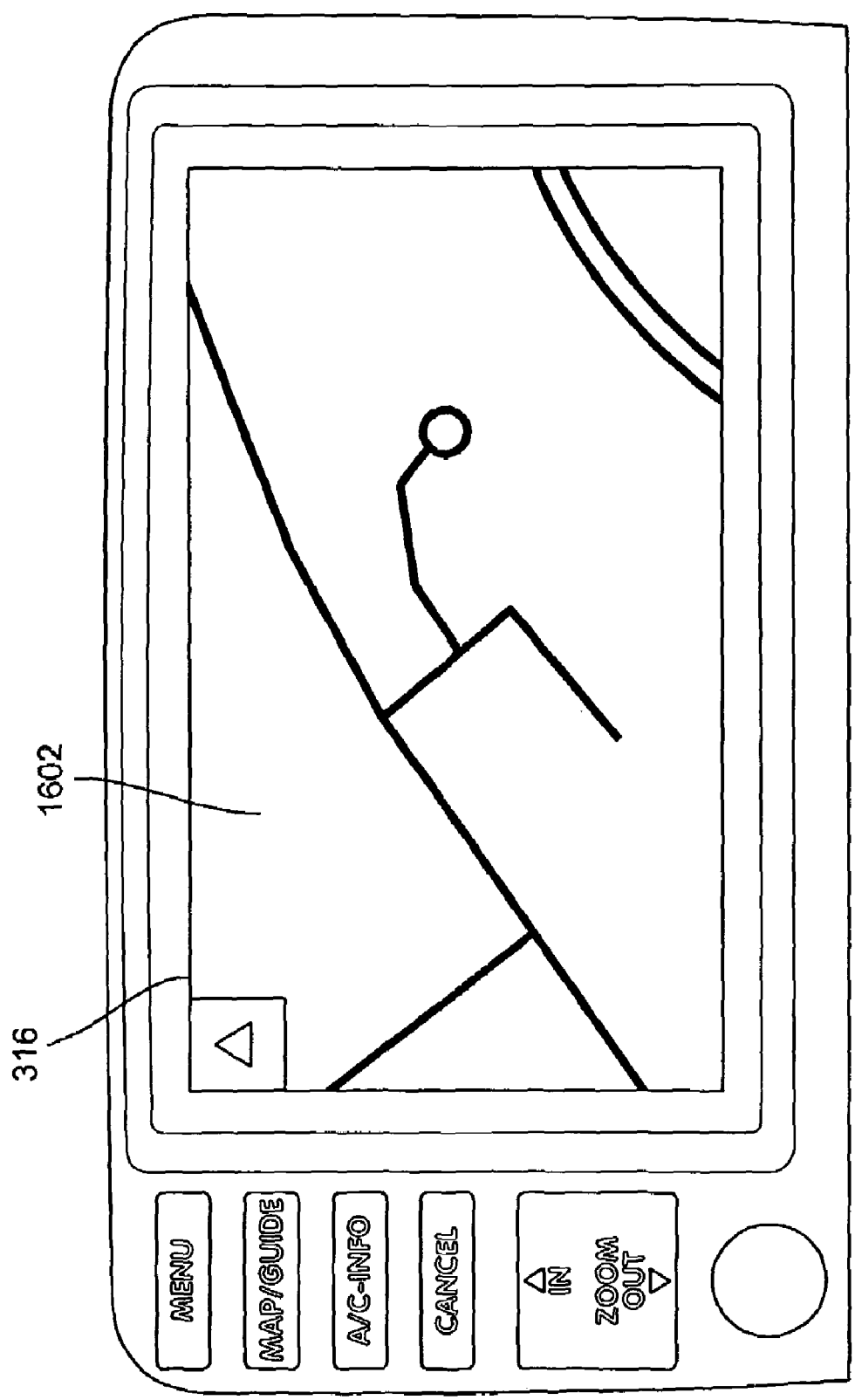
FIG. 16 is a schematic drawing of a preferred embodiment of a display in a day mode.
Figure 17:
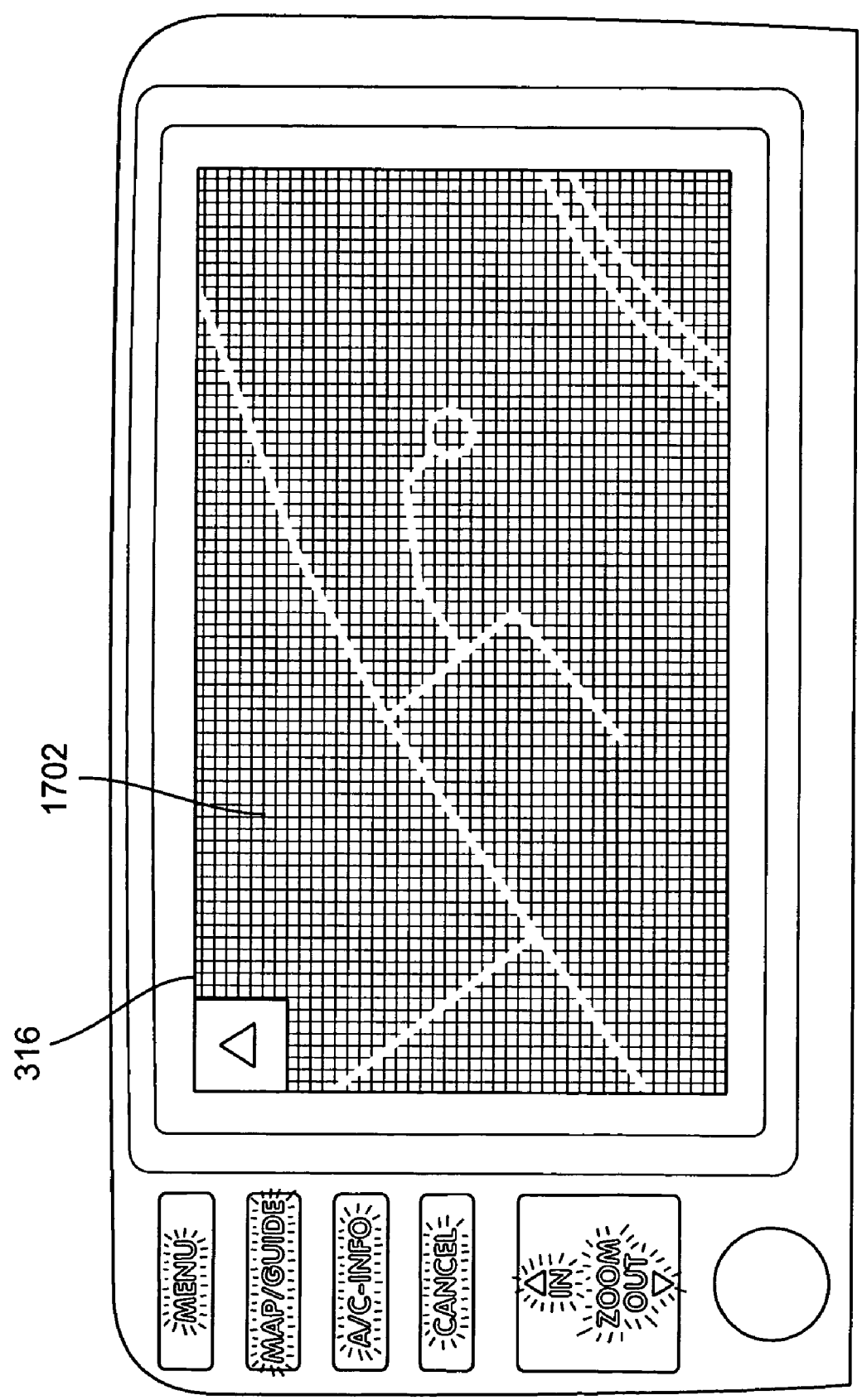
FIG. 17 is a schematic drawing of a preferred embodiment of a display in a night mode.

Some embodiments include provisions to alter or change the display mode of display 316 (see FIG. 3). Referring to FIGS. 16 and 17, some embodiments of display 316 can have a day mode, as shown in FIG. 16, and a night mode, as shown in FIG. 17. In the embodiment shown in FIG. 16, day mode includes a background 1602 that has a different color than the background 1702 of the night mode shown in FIG. 17. In some embodiments, the color of day mode background 1602 is lighter than the color of night mode background 1702. In a preferred embodiment, the color of day mode background 1602 is generally white and the color of night mode background 1702 is generally black.

In some embodiments, the foreground color can also be changed. In other embodiments, the same or similar foreground color can be used against either day mode background 1602 or night mode background 1702. In the embodiment shown in FIG. 16, day mode foreground 1604 is rendered in a first color and night mode foreground 1704 is rendered in a second color that is different than the first color. Preferably, colors that contrast well and are legible against their respective background colors are selected as the first and second colors. It is also possible to render day mode foreground 1604 in multiple colors as well as night mode foreground 1704.

Referring to FIGS. 3, 16 and 17, information from sensor 202 can be used by central unit 302 or display 316 to determine the mode of display 316. In some embodiments, one or more thresholds based on ambient light are used to change the color mode of display 316. In some embodiments, a single threshold is used, so that display 316 changes from day mode to night mode at a given threshold when ambient light is decreasing and from night mode to day mode at the same threshold when ambient light is increasing. However, it is also possible to provide two different thresholds that are used to change the mode of display 316.

In some embodiments, a first threshold is used as the boundary from nighttime to daytime and a second threshold is used as the boundary from daytime to nighttime. Preferably, the first threshold is at a greater ambient light condition than the second threshold. This means that, in a preferred embodiment, the change from nighttime to daytime is performed at a greater ambient light condition than the change from daytime to nighttime. In an exemplary embodiment, the first threshold is about 450 Lx and the second threshold is about 300 Lx. Considering the operation of the exemplary embodiment, assuming an initial 0 Lx condition (complete darkness, no ambient light), display 316 will change to daytime mode at about 450 Lx of ambient light. As darkness falls and ambient light decreases, display 316 will change from daytime mode to nighttime mode at about 300 Lx. This difference between the two thresholds is sometimes referred to as hysteresis.

The dimming features associated with step 608 can be used in conjunction with the day and night mode changes. It is possible to apply the dimming feature to the entire display 316 or just to backgrounds 1602 and 1702.

In some embodiments, switches can also include hysteresis. Preferably, a first threshold where switches transition from an illuminated condition to an off condition occurs at a level of ambient light that is greater than a second threshold, where the reverse occurs. In an exemplary embodiment, switch illumination is turned off at about 1000 Lx and switches are illuminated or turned on at about 500 Lx.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A method for controlling at least one interior illumination device of a motor vehicle comprising the steps of:
retrieving information related to an ambient light level;
determining a rate of change of the ambient light level;
altering an illumination characteristic of at least one illuminated component based on the rate of change of the ambient light level;
determining an initial ambient light level and comparing the initial ambient light level to at least one predetermined light limit,
wherein the illumination characteristic is changed if the rate of change is less than a predetermined rate of change and if the initial ambient light level is greater than the predetermined light limit;
retrieving vehicle speed information related to a speed of the motor vehicle;
providing a signal to the interior illumination device based on the vehicle speed information; and
wherein the vehicle speed information is used to alter the condition of the interior illumination device.

2. The method according to claim 1, wherein the condition is related to an illumination level of the interior illumination device.

3. The method according to claim 1, further comprising a step of providing a delay timer if the vehicle speed information indicates a vehicle speed that is less than a predetermined speed.

4. The method according to claim 3, wherein the delay timer holds a current condition of the interior illumination device.

5. The method according to claim 3, wherein the condition of the interior illumination device is adjusted after the timer has elapsed.

6. The method according to claim 3, wherein the delay timer has a time duration greater than an inherent delay of an interior illuminating system.

7. The method according to claim 1, further comprising a step of resetting a delay timer if the vehicle speed information indicates a vehicle speed that is greater than or equal to a predetermined speed.

8. A method for controlling an interior illumination system of a motor vehicle comprising the steps of:
retrieving information related to an ambient light level;
determining a rate of change of the ambient light level;
altering an illumination characteristic of at least one illuminated component based on the rate of change of the ambient light level; and
determining an initial ambient light level and comparing the initial ambient light level to at least one predetermined light limit,
wherein the illumination characteristic is changed if the rate of change is less than a predetermined rate of change and if the initial ambient light level is greater than the predetermined light limit.

9. The method according to claim 8, further comprising the steps of:
retrieving vehicle speed information related to a speed of the motor vehicle; and providing a signal to the interior illumination device based on the vehicle speed information;

wherein the vehicle speed information is used to alter the condition of the interior illumination device.

10. A method for controlling an interior illumination system of a motor vehicle comprising the steps of:

retrieving information related to an ambient light level;

determining a rate of change of the ambient light level;

altering an illumination characteristic of at least one illuminated component based on the rate of change of the ambient light level; and determining an initial ambient light level and comparing the initial ambient light level to at least one predetermined light limit, wherein the illumination characteristic is changed if the rate of change is greater than a predetermined rate of change and if the initial ambient light level is less than the predetermined light limit.

11. The method according to claim 10, further comprising the steps of:

retrieving vehicle speed information related to a speed of the motor vehicle; and providing a signal to the Interior illumination device based on the vehicle speed information, wherein the vehicle speed information is used to alter the condition of the interior illumination device.

12. The method according to claim 11, further comprising a step of providing a delay timer if the vehicle speed information indicates a vehicle speed that is less than a predetermined speed.

13. The method according to claim 12, wherein the delay timer holds a current condition of the interior illumination device.

14. The method according to claim 12, wherein the condition of the interior illumination device is adjusted after the timer has elapsed.

15. The method according to claim 12, wherein the delay timer has a time duration greater than an inherent delay of an interior illuminating system.

16. The method according to claim 11, further comprising a step of resetting a delay timer if the vehicle speed information indicates a vehicle speed that is greater than or equal to a predetermined speed.

* * * * *